Patented Feb. 10, 1953

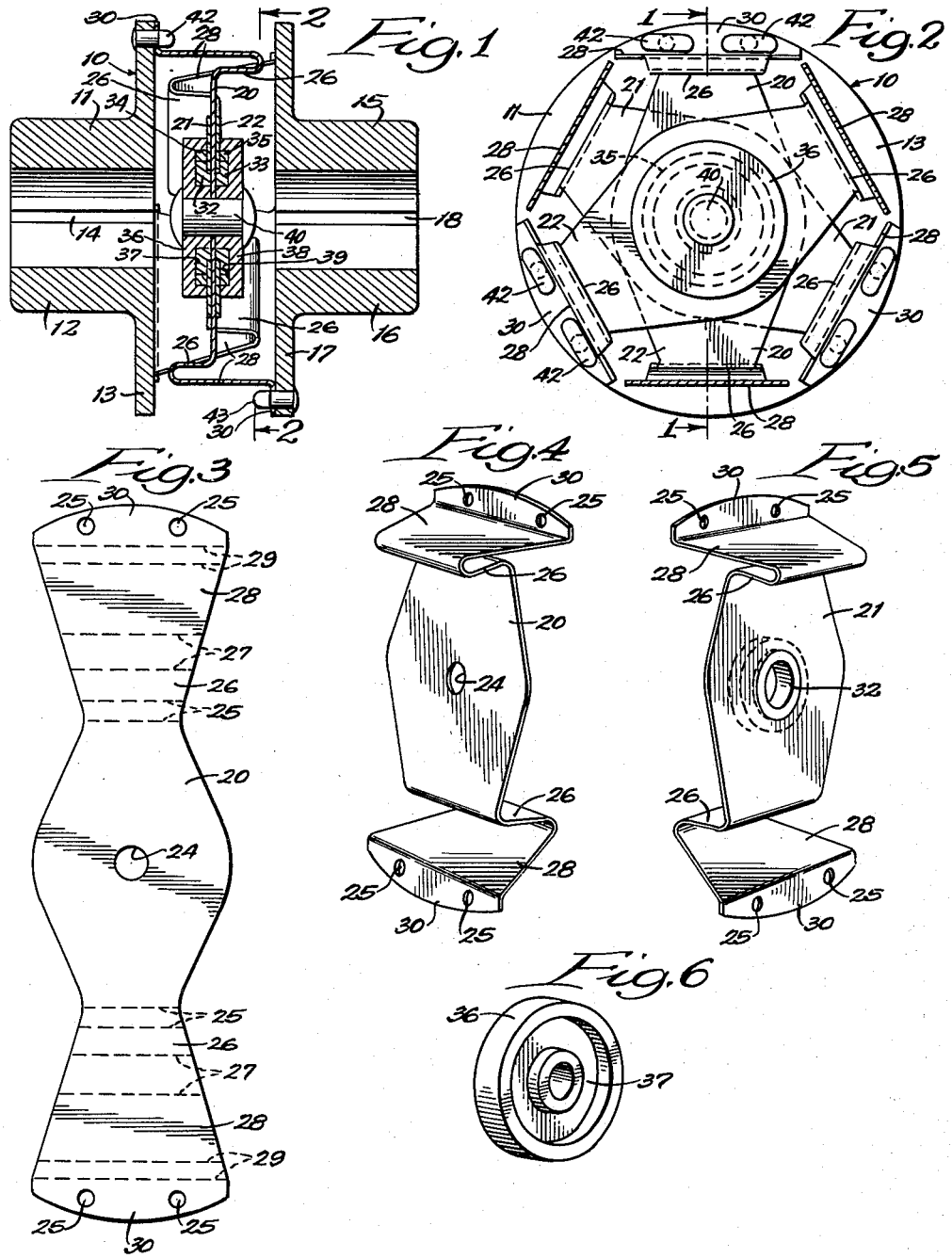

2,627,733

UNITED STATES PATENT OFFICE 2,627,733

CONSTANT VELOCITY SHAFT COUPLING

Walter E. Amberg, Beverly Shores, Ind.

Application December 14, 1949, Serial No. 132,893

7 Claims. (Cl. 64—21)

This invention is directed to shaft couplings for misalined shafts for transmitting rotation of one shaft to the other with constant velocity and balanced torque. This invention is an improvement of the invention disclosed and claimed in Walter E. Amberg Patent No. 2,481,640, patented September 13, 1949.

The constant velocity and balanced torque shaft coupling of the aforementioned patent includes a first fitting to be secured to one shaft, a second fitting to be secured to the other shaft, at least three diagonal levers interposed between the fittings, a pivotal connection joining the diagonal levers intermediate the ends thereof to form a planetary tripod, and universal connections connecting one end of each diagonal lever and the first fitting only and connecting the other end of each diagonal lever and the other fitting only. The planetary tripod formed of the three diagonal levers rotates about its own axis and transmits rotation from one shaft through the levers to the other shaft with constant velocity and balanced torque and without vibration regardless of misalinement of the shafts.

The principal object of this invention is to provide a modified form of a constant velocity and balanced torque shaft coupling for misalined shafts having substantially the same principles of operation and producing substantially the same results as in the aforementioned patent but being simpler and less expensive in construction. In this respect the shaft coupling of this invention utilizes diagonal spring leaves as the diagonal levers forming the planetary tripod. The spring leaves are pivotally connected together intermediate the ends thereof and each spring leaf has its end portions bent laterally in opposite directions, the laterally bent portions being secured to the fittings. The laterally bent portions of the spring leaves flex and twist to form substantially universal connections between the spring leaves of the planetary tripod and the fittings and at the same time eliminate moving parts requiring lubrication and maintain the shaft coupling in assembled relation. Since the turning torque transmitted by the spring leaves is transverse of the spring leaves, high torque may be transmitted and substantially free universal movement is provided.

Further objects of this invention reside in the details of construction of the shaft coupling and the cooperative relationship between the component parts thereof.

Other objects and advantages of this invention will become apparent to those skilled in the art upon reference to the accompanying specification, claims and drawing in which:

Fig. 1 is a vertical sectional view of the shaft coupling of this invention taken substantially along the line 1—1 of Fig. 2;

Fig. 2 is a sectional view of the shaft coupling taken substantially along the line 2—2 of Fig. 1;

Fig. 3 is a plan view of a spring leaf blank from which the diagonal spring leaves or levers are formed;

Fig. 4 is a perspective view of one of the formed diagonal spring leaves;

Fig. 5 is a perspective view of another of the formed diagonal spring leaves; and Fig. 6 is a perspective view of a part forming the bearing housing.

Referring now to the drawing, the shaft coupling of this invention is generally designated at 10. It includes a first fitting 11 having a hub 12 and a flange 13. The hub 12 is adapted to be received on a first shaft and is preferably provided with a key slot 14 for securing the fitting 11 for rotation with the shaft. The shaft coupling also includes a second fitting 15 having a hub 16 and a flange 17. This second fitting is adapted to receive another shaft and is preferably provided with a key slot 18 so that the second fitting may rotate with the second shaft. Interposed between the two fittings 11 and 15 is a planetary tripod consisting of the last three diagonal levers in the form of spring leaves 20, 21 and 22 respectively.

The three diagonal spring leaves are essentially the same in construction and are all formed from spring leaf blanks as illustrated in Fig. 3. The spring leaf blank is provided with a central hole 24 and with end holes 25. In forming the diagonal spring leaves the blank is bent in opposite directions along lines 26 to form substantially 90° bends and to form a laterally extending portion 26. The blank is also bent in opposite directions along the lines 27 to form substantially 180° bends and other laterally extending portions 28. The blank is also bent along lines 29 to provide ears 30 containing the holes 25. Thus, each diagonal spring leaf has a diagonal lever portion provided with laterally bent portions extending in opposite directions. These laterally bent portions may be twisted and flexed to provide substantially universal movement between the lever portion and the ears. As will be noted, the blank for forming the diagonal spring leaves is irregular in configuration and this is to provide proper flexing and twisting action.

The three diagonal spring leaves are pivotally connected together intermediate their ends. In this respect the diagonal spring leaves 21 and 22 are staked onto collars 32 and 33 respectively. These collars rotatably carry bearing rings 34 and 35 respectively. The collar 32 and bearing ring 34 is received in an annular recess 37 in a bearing part 36 and likewise the collar 33 and bearing ring 35 are received in an annular recess 39 in a bearing part 38. The bearing parts 36 and 39 rotatably support the bearing rings 34 and 35. The bearing parts 36 and 38 are clamped to the diagonal lever 20 by means of a rivet 40 extending through the bearing parts and the hole 24 in the diagonal spring leaf 20. Thus, the diagonal spring leaf 20 carries the bearing parts 36 and 38 which form a bearing housing for the collars 32 and 33 and the bearing rings 34 and 35. The three diagonal levers 20, 21 and 22 are, therefore, pivotally mounted for relative oscillation by means of the bearing rings 34 and 35. Preferably, the collars 32 and 33 and the bearing parts 36 and 38 are made of hardened steel while the bearing rings 34 and 35 are made of graphite bearing material. Therefore, the pivotal connection between the diagonal levers includes an oilless bearing to provide long life and service.

One end of each diagonal lever 20, 21 and 22 is secured to the flange 13 of the first fitting 11 by means of rivets 42 extending through the holes 25 in the ears 30 of the diagonal spring leaves. In a like manner the other end of each diagonal spring leaf is secured to the flange 17 of the other fitting 15 by means of rivets 43 extending through the holes 25 in the ears 30.

The diagonal spring leaves 20, 21 and 22 so pivoted together intermediate their ends and so secured to the flanges of the fittings form a planetary tripod for the purpose of transmitting rotation from one fitting to the other with constant velocity and balanced torque regardless of alignment of the shafts carrying the respective fittings. When one of the fittings is rotated torque is transmitted through the planetary tripod formed by the spring leaves to the other fitting and since the turning torque so transmitted is transverse of the spring leaves, high torque is positively transmitted.

In the rotatable operation of the shaft coupling 10 when the shafts are misalined, although the angular relationship between the diagonal spring leaves 20, 21 and 22 is under continuous change, the relationship between the opposing angles formed by the diagonal spring leaves remains constant. This condition plus the condition that each diagonal spring leaf of the planetary tripod, although under rotation is constantly changing its adjoinment length, that length always remains equally divided from its pivot point, self establishes the fulcrum or pivotal connection midway between the center lines of the misalined shafts. Accordingly, one shaft is driven by the other shaft regardless of misalinement at a constant velocity and with balanced torque and at thhe same time the planetary tripod rotates about its own center whereby eccentric motion and consequent vibration are entirely lacking.

The laterally bent portions 26 and 28 of the diagonal spring leaves flex and twist and operate as a universal connection between the diagonal spring leaves or levers and the fittings to maintain the pivotal connection of the diagonal spring leaves or levers midway between the axes of the two shafts. To provide free flexing and twisting of the spring leaves, they are formed of suitable spring material, such as spring stainless steel.

The bearing rings 34 and 35 and the associated bearing parts provide for free relative oscillations of the diagonal spring leaves 20, 21 and 22 forming the planetary tripod. Since the diagonal spring leaves are securely fastened to the two fittings, the shaft coupling is at all times maintained in assembled condition. The shaft coupling of this invention may be inexpensively manufactured and yet transmit great torque at constant velocity and constant torque.

While for purposes of illustration, one form of this invention has been disclosed, other forms thereof may become apparent to those skilled in the art upon reference to this disclosure, and accordingly, this invention is to be limited only by the scope of the appended claims.

I claim as my invention:

1. A constant velocity and balanced torque shaft coupling for misalined shafts comprising, a first fitting to be secured to one shaft, a second fitting to be secured to the other shaft, at least three diagonal spring leaves interposed between the fittings and each having its end portions bent laterally in opposite directions, a pivotal connection joining the diagonal spring leaves intermediate the ends thereof, and means for securing the laterally bent portion of one end of each diagonal spring leaf to the first fitting only and for securing the laterally bent portion of the other end of each diagonal spring leaf to the second fitting only.

2. A constant velocity and balanced torque shaft coupling for misalined shafts comprising, a first fitting to be secured to one shaft, a second fitting to be secured to the other shaft, at least three diagonal spring leaves interposed between the fittings and each having its end portions bent laterally in opposite directions with each bent portion including bends of substantially ninety and one hundred and eighty degrees, a pivotal connection joining the diagonal spring leaves intermediate the ends thereof, and means for securing the laterally bent portion of one end of each diagonal spring leaf to the first fitting only and for securing the laterally bent portion of the other end of each diagonal spring leaf to the second fitting only.

3. A constant velocity and balanced torque shaft coupling for misalined shafts comprising, a first fitting to be secured to one shaft, a second fitting to be secured to the other shaft, at least three diagonal spring leaves interposed between the fittings and each having its end portions bent laterally in opposite directions, a pivotal connection joining the diagonal spring leaves intermediate the ends thereof and including a bearing part carried by each of the diagonal spring leaves, and means for securing the laterally bent portion of one end of each diagonal spring leaf to the first fitting only and for securing the laterally bent portion of the other end of each diagonal spring leaf to the second fitting only.

4. A constant velocity and balanced torque shaft coupling for misalined shafts comprising, a first fitting to be secured to one shaft, a second fitting to be secured to the other shaft, at least three diagonal spring leaves interposed between the fittings and each having its end portions bent laterally in opposite directions, a pivotal connection joining the diagonal spring leaves intermediate the ends thereof and including a bearing housing carried by one of the diagonal spring leaves and a bearing part carried by each of the other diagonal spring leaves and contained within the bearing housing, and means for securing the laterally bent portion of one end of each diagonal spring leaf to the first fitting only and for securing the laterally bent portion of the other end of each diagonal spring leaf to the second fitting only.

5. A constant velocity and balanced torque shaft coupling for misalined shafts comprising, a first fitting to be secured to one shaft, a second fitting to be secured to the other shaft, at least three diagonal levers interposed between the fittings and having flexible end sections extending substantially perpendicularly therefrom and integral flanges extending from the ends thereof in substantial parallelism with the body portion of the levers, a pivotal connection joining the diagonal levers intermediate the ends thereof, and means for connecting the flange at one end of each diagonal lever to the first fitting only and for connecting the flange at the other end of each diagonal lever to the second fitting only.

6. A constant velocity and balanced torque shaft coupling for misalined shafts comprising, a first fitting to be secured to one shaft, a second fitting to be secured to the other shaft, a plurality of diagonal spring leaves interposed between the fittings and each having its end portions bent laterally in opposite directions, a pivotal connection joining the diagonal spring leaves intermediate the ends thereof, and means for securing the laterally bent portion of one end of each diagonal spring leaf to the first fitting only and for securing the laterally bent portion of the other end of each diagonal spring leaf to the second fitting only.

7. A constant velocity and balanced torque shaft coupling for misalined shafts comprising, a first fitting to be secured to one shaft, a second fitting to be secured to the other shaft, a plurality of diagonal levers interposed between the fittings and having flexible end sections extending from the ends thereof, a pivotal connection joining the diagonal levers intermediate the ends thereof, and means for connecting the flexible end section at one end of each diagonal lever to the first fitting only and for connecting the flexible end section at the other end of each diagonal lever to the second fitting only.

WALTER E. AMBERG.

REFERENCES CITED

The following references are of record in the file of this patent:

UNITED STATES PATENTS

| Number | Name | Date |
|---|---|---|
| 2,481,640 | Amberg | Sept. 13, 1949 |